United States Patent [19]
Murphy

[11] 3,881,520
[45] May 6, 1975

[54] ONE-PIECE RACEWAY WITH INTEGRAL COUPLING

[75] Inventor: Robert H. Murphy, West Hartford, Conn.

[73] Assignee: The Wiremold Company, West Hartford, Conn.

[22] Filed: Jan. 7, 1974

[21] Appl. No.: 431,090

[52] U.S. Cl. ............ 138/109; 24/230 SL; 138/155; 138/156; 174/68 C; 285/424; 403/292; 403/363
[51] Int. Cl. ........ F16l 9/22; F16l 21/00; F16l 37/02
[58] Field of Search ............ 138/103, 109, 155–156, 138/177–178; 285/424; 403/13, 14, 109, 292, 363; 174/68 C, 845; 339/22 R, 22 B; 24/230 F, 230 SL; 238/10 E, 10 F; 160/345; 46/1 K

[56] References Cited
UNITED STATES PATENTS

| | | | |
|---|---|---|---|
| 1,622,032 | 3/1927 | Frederickson | 138/156 X |
| 1,676,486 | 7/1928 | Frederickson | 138/156 X |
| 1,729,315 | 9/1929 | Widell | 138/103 |
| 3,642,310 | 2/1972 | Hudson | 403/292 X |

*Primary Examiner*—John W. Huckert
*Assistant Examiner*—Charles Gorenstein
*Attorney, Agent, or Firm*—Prutzman, Hayes, Kalb & Chilton

[57] ABSTRACT

A raceway for electrical wiring is provided as a one-piece member having an elongated base wall portion, a canopy portion integrally cooperating with the base wall along the length thereof to form an enclosed raceway cavity and an integral coupling portion extending longitudinally from one end of the base beyond the canopy. The coupling portion has a lateral dimension slightly greater than the raceway cavity adjacent the base wall and is offset therefrom by at least the thickness of the base wall. The coupling portion is provided with a narrow slot extending longitudinally therethrough and continuously along the base wall portion to impart flexibility and resiliency to the raceway and permit contraction of the coupling portion during assembly.

7 Claims, 3 Drawing Figures

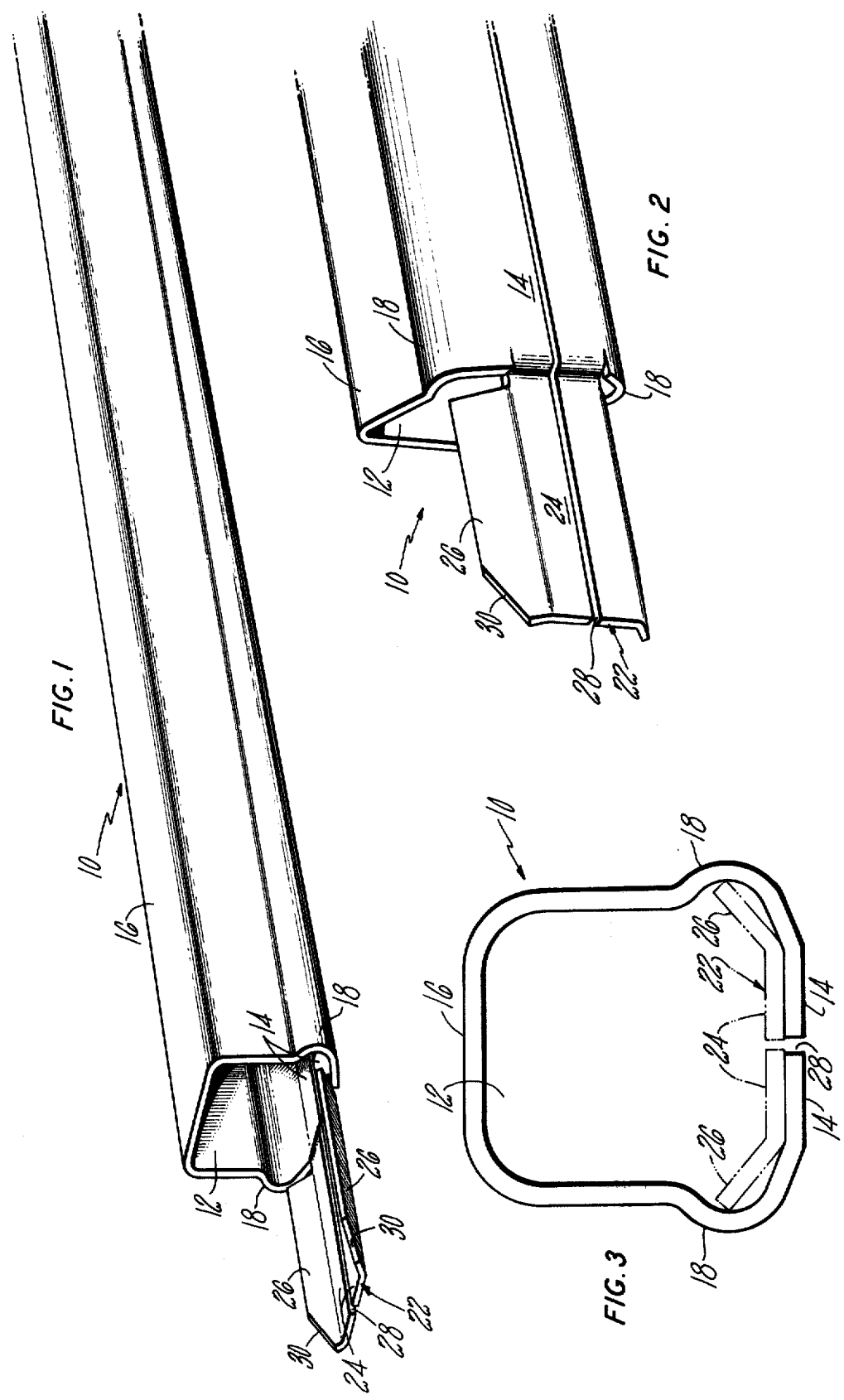

3,881,520

ONE-PIECE RACEWAY WITH INTEGRAL COUPLING

BACKGROUND AND SUMMARY OF THE INVENTION

The present invention relates generally to raceways for electrical wiring and the like and is more particularly concerned with a new and improved one-piece raceway member having an integral coupler associated therewith.

Heretofore the so called "one-piece" raceways for electrical wiring and the like have actually comprised at least two interfitting members that were permanently assembled at the factory prior to distribution for sale and use. These members consisted of a first U-shaped member and a second closure plate permanently secured within the opening of the U-shaped member. These multicomponent "one-piece" raceways, which find particular application in ceiling and wall installations especially for long unbroken wiring runs, are produced in individual lengths of about ten feet and are interconnected by accessory components such as separate connector members.

It now has been found that a new and improved raceway can be provided from only a single component thereby eliminating the time consuming assembly operation required heretofore. Accordingly it is an object of the present invention to provide a unitary one-piece raceway member of the type described that is of sturdy, durable yet lightweight construction and includes an integral coupler portion that obviates the necessity for a multiplicity of accessory components. Included in this object is the provision for a raceway of a more simplified design that is well suited to interconnection into a raceway system in a rapid and facile manner due to its resilient interconnecting capability.

Other objects will be in part obvious and in part pointed out in more detail hereinafter.

These and related objects are accomplished in accordance with the present invention by providing a new and improved raceway for electrical wiring and the like comprised of an elongated tubular member of one-piece construction having an elongated base wall portion, a canopy portion integrally cooperating therewith along the length thereof to form an enclosed raceway cavity and an integral coupling portion extending longitudinally from one end of the base wall portion. The coupling portion has a lateral dimension slightly greater than the raceway cavity adjacent the base wall and is offset therefrom by at least the thickness of the base wall. The coupling portion is provided with a narrow slot extending longitudinally therethrough and continuously along the base wall portion to provide resiliency and permit contraction of the coupling portion during assembly.

A better understanding of the invention will be obtained from the following detailed description and the accompanying drawing which set forth an illustrative embodiment indicative of the way in which the principles of the invention are employed.

A BRIEF DESCRIPTION OF THE DRAWING

In the drawing:

FIG. 1 is a perspective view of a portion of a raceway incorporating the features of the present invention;

FIG. 2 is an enlarged perspective view similar to FIG. 1 with the raceway oriented so as to better illustrate the base wall portion and integral coupler of the raceway; and, FIG. 3 is a further enlarged end view of the raceway of FIGS. 1 and 2 illustrating the coupler interconnection between adjacent raceway members.

DESCRIPTION OF A PREFERRED EMBODIMENT

Referring now to the drawing in greater detail wherein like reference numerals indicate like parts throughout the several figures, the present invention is shown as incorporated within a sheet metal raceway, generally designated by the numeral 10 and having a generally rectangular cross sectional configuration. The raceway 10 is a unitary one-piece member of uniform size and shape throughout its length. As shown, the rectangular raceway cavity 12 is defined by a substantially flat base wall portion 14 and an integral, generally U-shaped canopy portion 16 that includes outwardly bowed channels 18 on opposite sides thereof adjacent the juncture of the canopy 14 with the base wall portion 12. The channels 18 extend along the full length of the raceway and impart a concave shape to a portion of each side of the canopy to assist in retaining the abutting raceway members in an assembled array.

It is an advantageous feature of the present invention that the raceway 10 requires no separate auxiliary components to facilitate assembly since it is provided with an integral coupler 22. As shown, the coupler 22 consists of a generally flat tongue portion 24 integrally and longitudinally projecting from one end of the base wall portion 14 and offset therefrom by a distance approximately equal to the wall thickness of the metal raceway member. As will be appreciated the offset nature of the coupler is such that it will be received within the raceway cavity of an adjacent raceway member to permit proper abutting alignment thereof. The coupler 22 extends well beyond the end of the canopy portion 16 and is provided with a pair of angularly oriented side wing portions 26 that are connected to the remainder of the raceway through only the tongue portion 24. The wing portions 26 are disposed at an angle of about 140 degrees to the flat tongue portion 24 but, as can be appreciated, the specific angular orientation of the wing portions may vary without departing from the spirit of the present invention. In general it is preferred that portions 26 be oriented so as to provide a lateral dimension slightly greater than the lateral dimension of the raceway cavity 12 within the channels 18.

A longitudinally extending slot 28 centrally bifurcates the tongue portion 24 along its longitudinal extent and along the full length of the base wall portion 14 to impart a limited degree of flexibility and resiliency to the entire structure. This bifurcating slot 28 additionally permits resilient flexing of the tongue-like coupling member 22 and facilitates lateral contraction of the slotted coupler when it is assembled within the channels 18 of an adjacent raceway member. As best shown in FIGS. 1 and 2, the angularly oriented wing portions 26 of the coupler are provided with longitudinally tapered outer ends 30 to facilitate insertion of the coupler into the end of an adjacent raceway member. Adjustment in the angular orientation of portions 26 can be made to control the degree of compression to which the coupler is subjected and, consequently, the tightness of the interconnection. Additionally the coupler 22 is connected to the base wall portion 14 only at its flat tongue portion 24 so that the wing portions are free to be adjustably positioned to an angle that will assure firm abutting engagement with the channels 18 to resist misalignment of the ends of the raceway members after assembly thereof.

As can be seen from the foregoing detailed description the present invention provides a substantially simplified design within a single piece raceway construction that obviates the need for accesssory components yet assures a firm reliable interconnection between raceway members coupled with an inherent resiliency that enables rapid installation and secure assembly. Additionally the one-piece construction permits the utilization of appropriate ornamental designs within the canopy portion thereof to suit the particular installation surface with which the raceway will be used.

As will be appreciated by persons skilled in the art, various modifications, adaptations and variations of the foregoing specific disclosure can be made without departing from the teachings of the present invention.

I claim:

1. A raceway for electrical wiring and the like comprising an elongated tubular member of one-piece construction having an elongated base wall portion, a canopy portion integral with the base wall portion along its length and cooperating therewith to form an elongated enclosed raceway cavity, and a coupling portion integral with the base wall portion and extending longitudinally from one end thereof beyond the canopy portion, said coupling portion being offset from the base wall portion by a distance equal to at least the thickness of the base wall portion and having a lateral dimension slightly greater than the lateral dimension of the raceway cavity adjacent the base wall, said coupling portion and said base wall portion having a continuous narrow slot extending longitudinally through the coupling portion and along the base wall portion to impart flexibility and resiliency to the raceway and permit contraction of the coupling portion during assembly.

2. The raceway of claim 1 wherein said canopy portion includes arcuate channel portions extending longitudinally adjacent the point of interconnection with the base wall portion, said channel portions being adapted to cooperate with said coupling portion to resist misalignment between assembled raceway members.

3. The raceway of claim 1 wherein the coupling portion includes angularly disposed side portions spaced from the canopy portion of the raceway to which it is integrally connected, the free edges of said angularly oriented portion defining said lateral dimension of said coupling portion.

4. The raceway of claim 1 wherein said narrow slot extends centrally along said coupling portion and said base wall portion.

5. The raceway of claim 1 wherein said raceway cavity defined by the base wall portion and canopy portion is of generally rectangular cross section and the canopy portion includes outwardly bowed channel portions on opposite sides of the raceway cavity, said channels extending longitudinally from at least one end of the raceway and adapted to cooperatively engage said coupling portion.

6. A self-connecting raceway for electrical wiring formed from a single sheet-like material comprising an elongated, substantially enclosed raceway housing having a continuous narrow slot extending longitudinally therealong to impart resiliency thereto, and a coupler integrally projecting from one end of the housing to provide endwise self-connection between adjacent lengths thereof, said coupler being longitudinally bisected by said narrow slot and having an adjustable lateral dimension slightly greater than the lateral dimension of the raceway, said coupler being adapted to resiliently cooperate with the raceway housing to assure firm interconnection therebetween and resist misalignment between assembled lengths thereof.

7. The raceway of claim 6 wherein said coupler includes a longitudinally extending central tongue portion and lateral tab portions angularly disposed relative to the tongue portion and having free lateral edges defining the adjustable lateral dimension of the coupler, said tongue portion being split by said slot, said free lateral edges being adapted to cooperatively engage the raceway housing and inwardly bias the split tongue portion upon assembly.

* * * * *